3,320,028
PRODUCTION OF BIUREA AND HYDRAZINE
William C. Klingelhoefer, Hopewell, and Harold T. Gerry, Petersburg, Va., assignors to Allied Chemical Corporation, New York, N.Y., a corporation of New York
Filed Nov. 5, 1962, Ser. No. 235,425
17 Claims. (Cl. 23—190)

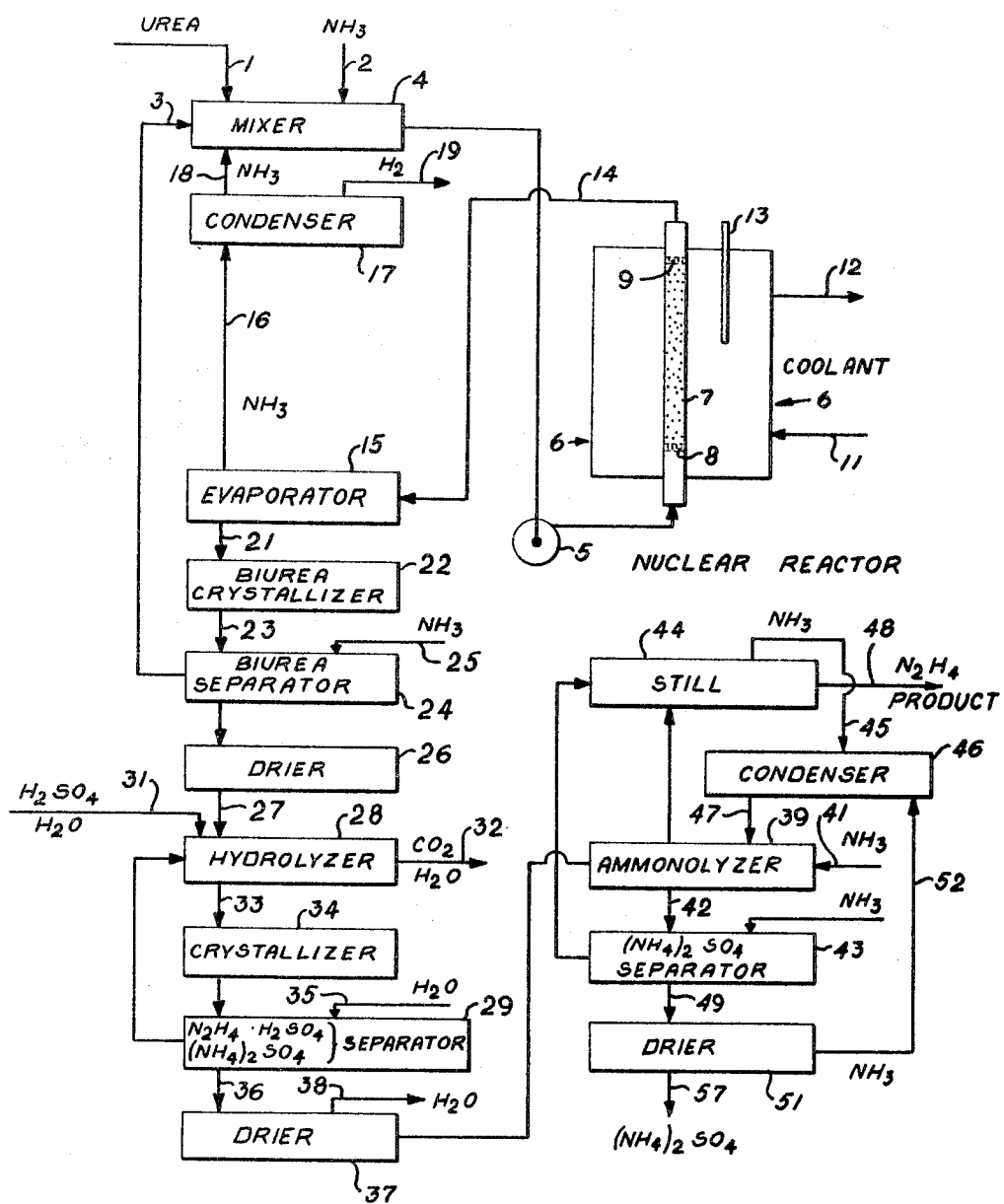

This invention relates to the preparation of biurea and hydrazine.

Biurea

among other uses, is useful as an intermediate in the production of resins, for example, by reaction with formaldehyde, is recommended as a growth inhibitor, reacts with adipamide or sebacamide under heat and pressure to produce fiber-forming polyamides, and is used along with azocarbonamide as a blowing agent to produce foamed polyethylenes and polyvinyl chlorides.

Hydrazine, among other uses such as an intermediate in the production of other compounds, is a promising liquid missile fuel.

The production of hydrazine by the known Raschig process using ammonia, chlorine and sodium hydroxide as raw materials or by converting urea to chlorourea which is reacted with ammonia to form semicarbazide which is converted to hydrazine is comparatively expensive.

The nuclear irradiation of ammonia to produce hydrazine has been suggested (Chemical Engineering Progress, volume 57, No. 3, 1961). In this process a substantial amount of the ammonia is decomposed to nitrogen and hydrogen and the overall economies of the process do not appear to be attractive from an economic standpoint.

It is a principal object of this invention to provide a nuclear irradiation process of producing biurea and/or hydrazine.

It is another object of this invention to provide a nuclear irradiation process of producing hydrazine, which process is economically attractive particularly from the standpoint of the hydrazine yield based on the quantity and cost of the raw materials employed in the process and consumed to produce hydrazine.

Other objects and advantages of this invention will be apparent from the following description thereof.

In accordance with this invention a nitrogen compound, namely, urea, melamine, guanidine, their acid salts, or mixture thereof, is employed as the raw material reactant. This reactant is subjected to nuclear irradiation, i.e, treated in a nuclear reactor where the reactant is exposed to fission fragment recoil energy, neutron energy and the radiations present to convert the reactant to an intermediate product, which in the case of urea is biurea. The biurea can be separated from the fission materials and unreacted urea, for example, by extraction with ammonia. Biurea is thus a useful end product of the process.

In the production of hydrazine, the intermediate product thus produced is separated from the unreacted or unconverted reactant and the fissionable material. The intermediate product can be hydrolyzed to produce hydrazine, in the case of the irradiation of urea, as indicated, some of the intermediate product, namely, biurea, can be recovered as such, as a useful product of the process. The separated unreacted reactant is recycled to the nuclear reactor. In this way the yield based on the reactant consumed in the process is high; the efficiency of utilization of urea in this process can be as high as about 94% by weight of the urea introduced into the process.

The irradiation step in which the nitrogen-containing reactant is treated in the nuclear reactor, which can be any known type of reactor, can be carried out in several ways:

(a) Treatment of a mixture of solid reactant, e.g., urea, with natural or enriched fissionable material such as uranium oxide, uranium 233 or plutonium 239. The fissionable material can be used in various chemical combinations or physical forms compatible with the other materials in or passed through the nuclear reactor;

(b) Treatment of a solution of the nitrogen-containing reactant in liquid ammonia, to which solution is added the finely divided fissionable material;

(c) Treatment of a solution of the nitrogen-containing reactant in liquid ammonia with the fissionable material contained in glass fibers, such as the known commercial glass fiber packing sold under the trademark Fiberglas (Owens-Corning Fiberglas Corporation);

(d) Treatment of the nitrogen-containing reactant as a molten mixture with the fissionable material in finely divided form or in glass fibers.

The mixture of nitrogen-containing reactant and fissionable material is introduced into the nuclear reactor to maintain the supply of fissionable material for the chain reaction to proceed while removing from the reactor the intermediate reaction product along with fission material at a rate proportional to the feed rate to the reactor to avoid accumulation of intermediate reaction product and fission material within the reactor. The feed and wthdrawal rates can be controlled to provide residence times of from about 0.1 second to one hour. Of course, the exact feed and withdrawal rates will depend on the capacity of the nuclear reactor used.

The separation of the intermediate product, biurea, when urea is used as the reactant, from the unreacted reactant and fission material is effected, for example, by extraction with a suitable solvent for both the intermediate product and the unreacted reactant. For example, ammonia, which is a good solvent for urea (a urea-ammonia solution saturated at 15° C. contains about 45 weight percent urea) and does not result in a decrease in the yield of hydrazine can be added to the withdrawn material in amount to dissolve all of the reactant and intermediate product and thus separate same from the fission materials. Such extraction can be effected at a temperature within the range of −40° to 100° C. and under pressure conditions to maintain the ammonia in the liquid phase. The resultant solution of reactant and intermediate product is then separated from the fission material by filtration or centrifugal separation. The solution is then cooled to crystallize the intermediate product, leaving the reactant in solution. Usually cooling to a temperature just above the temperature at which the reactant remains in solution will suffice to effect the crystallization of the intermediate product. Employing ammonia as the solvent and urea as the reactant, cooling to about 20° C. below the extraction temperature will effect good crystallization of the biurea; the ammonia solution of urea can be recycled to the nuclear reactor for the irradiation treatment.

When guanidine or melamine, or mixtures thereof with or without urea, are irradiated, this can be effected in any of the manners disclosed above in connection with the irradiation of urea. The intermediate product produced as a result of the irradiation, which when guanidine is treated contains 1,1'-biguanidine and when melamine is irradiated contains N,N'-bi(2,4,6-triamino-s-triazine), is separated by extraction with a suitable solvent for both the intermediate product and the unreacted reactant, thus separating the latter from the fission material. The resultant solution is then cooled to crystallize the intermediate product leaving the reactant in solution.

This solution can be recycled through the reactor or the reactant can be recovered from the solution and recycled to the nuclear reactor in admixture with the fission material such as natural or enriched uranium compound or plutonium.

When producing hydrazine, the intermediate product thus recovered is hydrolyzed by treatment with an acid, such as sulfuric or phosphoric acid. Hydrolysis is carried out at a temperature within the range of from 100° to 200° C. The hydrazine salt of the acid used in the hydrolysis is thus produced upon cooling of the mixture to a temperature sufficiently low to crystallize this hydrazine salt. The salt crystals are then separated as by filtration or centrifugal separation and the salt converted to hydrazine product and ammonium salt by treatment with ammonia in the stoichiometric amount for the reaceion to take place. This reaction takes place at a temperature within the range of from —40 to 50° C.

During the irradiation in the nuclear reactor a suitable cooling medium, such as air, is passed in heat exchange relation with the mixture of nitrogen compound and fission material to prevent the temperature thereof rising to the point where the desired intermediate product is decomposed. Desirably the temperature in the zone of the mixture of nitrogen compound and fission material is maintained within the range of from 30° to 100° C.

The intensity of irradiation is not critical but is one of the important factors which determine the time required to obtain the desired extent of reaction, i.e., the proportion of the feed converted to intermediate product which upon hydrolysis forms hydrazine, or when irradiating urea the proportion of the urea feed converted to biurea which can be recovered as such or converted to hydrazine. Irradiation can be effected satisfactorily in nuclear reactors operated with neutron fluxes in the range of $10^{14}$ to $10^{15}$ neutrons per square centimeter per second, although the invention is not limited to effecting the irradiation in nuclear reactors operated with such neutron fluxes but can be carried out in all nuclear reactors in which fission fragment recoil energy and neutron energy are available. It is preferred to use fission recoil energy rather than just the neutron energy and gamma radiation available in a nuclear reactor. When passing a solution of urea in ammonia through a nuclear reactor section where the solution passes in contact with glass fiber packing containing $U^{235}$ the extent of reaction is dependent on:

(1) $U^{235}$ content of the glass fibers;
(2) The density of packing of glass fibers;
(3) The neutron flux; and
(4) The rate of flow of solution through the nuclear reactor section.

The optimum conditions for relatively high conversions of the nitrogen-containing reactant per pass through the nuclear reactor section can readily be determined by a few trial experiments.

The attached drawing is a flow sheet showing somewhat diagrammatically one illustrative arrangement of equipment for practicing the process of this invention employing urea as the nitrogen-containing reactant. It will be understood that the invention is not limited to the arrangement of equipment shown in this flow sheet, nor to the use of urea as the reactant, or sulfuric acid as the acid hydrolysis medium, as indicated on the drawing, and includes procedures in which guanidine, melamine and mixtures of either or both guanidine or melamine with or without urea are irradiated and the intermediate product thus produced hydrolyzed to form hydrazine.

In the drawing, urea, ammonia and a recycle stream from a later step, hereinafter identified, are fed respectively through lines 1, 2 and 3 into a mixer 4, where a solution containing about 50 weight percent urea with smaller amounts of other constitutents, such as biurea, the remainder being chiefly the ammonia solvent, is produced. The solution from mixer 4 is pumped by pump 5 into the nuclear reactor 6 containing a number of tubular elements, one of which is indicated at 7. These tubular elements contain the fissionable material, such as the uranium compound or plutonium, preferably $U^{235}$, desirably on glass fiber packing positioned in the tubes between perforated end plates 8 and 9 therein. The reactor is cooled to within the range of from about 60° to 150° C. by a suitable coolant, such as air, which enters at 11 and leaves the reactor at 12. The fission process is maintained at the desired rate by regulating the position of the neutron absorbing rods 13, as well known in the operation of nuclear reactors. The urea-ammonia solution produced in the mixer 4 passes through the packing containing the fissionable material in the tubes 7 of the reactor 6. The energy from the fission reaction causes reaction to take place in the solution which results in the formation of biurea along with some hydrogen and minor amounts of by-products.

The reaction mixture flows from the reactor through line 14 to the evaporator 15 where part of the ammonia is evaporated and the solution is cooled to a temperature within the range of 50° to 60° C. The ammonia vapors pass through line 16 into the condenser 17 producing liquid ammonia which is fed through line 18 into mixer 4. Hydrogen and other non-condensible gases are removed from condenser 17 through line 19 and can be used for any desired purpose such as the synthesis of ammonia.

From the evaporator 15 the concentrated solution passes through line 21 into the biurea crystallizer 22 where it is cooled to a suitable temperature to effect crystallization of the biurea producing a slurry of biurea crystals in an ammonia solution of urea. The resultant slurry flows through line 23 to a filter or centrifugal separator 24 where the biurea crystals are separated from the liquid. The biurea crystals are washed with ammonia introduced through line 25 to effect removal of residual urea. The resultant wash solution and the mother liquor are fed through line 3 into the mixer 4 and constitute the aforesaid recycle stream introduced into this mixer.

The washed biurea crystals are introduced into a drier 26 where adherent ammonia is removed therefrom, desriably by heating the crystals to a temperature to drive off the ammonia. The dried crystals are fed through line 27 into a hydrolyzer 28 where they are mixed with an acid solution from filter or centrifugal separator 29 and with make-up sulfuric acid and water introduced through line 31. The mixture in the hydrolyzer 28 is heated to a temperature within the range of 120° to 160° C. for about 1 to 10 hours. The biurea is thus hydrolyzed to produce a solution of hydrazine sulfate and ammonium sulfate and carbon dioxide which goes off along with water through line 32.

The mixture from the hydrolyzer 28 is fed through line 33 into a crystallizer 34, where the mixture is cooled to about 30° C. and part of the hydrazine sulfate and ammonium sulfate crystallized out. The resultant slurry is passed to a filter or centrifugal separator 29 where the mixed crystalline material is separated and washed with water introduced through line 35. The resultant acid solution as noted above is recycled to the hydrolyzer 28. The crystalline material passes through line 36 to a drier 37, where it is heated to a temperature of amout 120° C. and thus thoroughly dried. The water is taken off from drier 37 through line 38.

The dried mixture of ammonium sulfate and hydrazine sulfate is passed to an ammonolyzer 39 where it is treated with liquid ammonia at about 100° C. Ammonia is introduced through line 41. The hydrazine sulfate is thus decomposed to form ammonium sulfate and a solution of hydrazine in ammonia. This mixture passes through line 42 to a filter or centrifugal separator 43 where the ammonium sulfate is separated and washed with liquid ammonia. The filtrate or mother liquor passes from filter or centrifugal separator 43 to a still 44 where the ammonia is distilled off, the ammonia vapors flowing through line 45 into condenser 46, where they are condensed. The resultant condensate flows through line 47 to the ammonolyzer 39. The hydrazine is thus separated from the ammonia in still 44 and taken off as product through line 48.

The ammonium sulfate from the filter or centrifugal separator 43 passes through line 49 into drier 51 where any ammonia is removed by heating the ammonium sulfate to the necessary temperature to drive off the ammonia. The ammonia vapors flow through line 52 into the condenser 46. The dried ammonium sulfate is removed as by-product through line 57.

The following examples are given to illustrate the invention without, however, limiting the invention to these illustrative exemplifications. In these examples parts are by weight and temperatures in degrees C. The first four examples demonstrate the efficacy of a nuclear reactor to convert urea, guanidine, melamine or mixtures thereof to an intermediate product which can be hydrolyzed to produce hydrazine.

*Example I*

A quartz reaction tube was loaded with 2.29 grams of urea and the tube evacuated and sealed. The urea was irradiated in a nuclear reactor at about 70° C. for ten hours with a flux of $1 \times 10^{13}$ neutrons per sq. cm. per second. The quartz tube was then removed from the nuclear reactor and was placed in a vacuum system for examination of the products. The tube was broken open and the released vapors were passed over concentrated sulfuric acid to remove any ammonia or hydrazine present. The resultant gas amounted to 3.6 ml. STP and was found to contain a small amount of nitrogen and a major proportion of hydrogen. The acid used above was analyzed for hydrazine, but none could be detected. This indicates that no appreciable amount of free hydrazine vaporized under the vacuum conditions.

The residual material in the quartz reaction tube was dissolved in acidified water. Part of the solution was analyzed for hydrazine and showed the presence of $52 \times 10^{-6}$ grams of hydrazine for the entire sample. Another part of the sample was boiled with an excess of 25 wt. percent sulfuric acid for twenty-two hours and analysis then showed the presence of $3500 \times 10^{-6}$ grams of hydrazine for the entire sample. From this analytical data, it is evident that the material obtained from the irradiation step contained about 0.55 wt. percent of biurea.

*Example II*

The procedure was the same as in Example I except that 1.82 grams of a mixture of 10 weight percent ammonium chloride with 90 weight percent of urea was subjected to irradiation. The residual material in the tube after release of the gases (3.0 ml. at STP) was hydrolyzed by boiling with sulfuric acid as in Example I. analysis showed the presence of $1600 \times 10^{-6}$ grams of hydrazine based on the amount of urea subjected to irridiation.

*Example III*

In this example 1.70 grams of guanidine hydrochloride was subjected to irradiation as in Example I. The gas recovered from the tube after irradiation amounted to 1.4 ml. STP and was mainly hydrogen. A portion of the residual material was boiled with sulfuric acid as in Example I. Analysis showed the presence of $32 \times 10^{-6}$ grams of hydrazine based on the amount of guanidine hydrochloride subjected to irradiation.

*Example IV*

In this example 1.93 grams of melamine was subjected to irradiation as in Example I. 0.6 ml. STP gas was recovered from the tube after irradiation. A portion of the residual material was boiled with sulfuric acid as in Example I. Analysis showed the presence of $184 \times 10^{-6}$ grams of hydrazine in the entire sample.

What takes place during the irradiation and the explanation therefor is not fully understood. The following explanation is considered to be reasonably accurate and is advanced to facilitate a better understanding of the invention. The irradiation in the nuclear reactor has its largest direct effect on the nitrogen content of the urea, guanidine and melamine whether as such or in the form of their acid salts such as the hydrogen chloride, sulfuric acid or nitric acid salts. A small fraction of the nitrogen atoms react with neutrons to produce a proton and carbon as follows:

$$N^{14}{}_{(n,p)}C^{14}$$

This reaction releases about 450,000 electron volts of energy in the form of rapidly moving product atoms. This energy brings about a change in the urea to form biurea, and in the guanidine and melamine to produce intermediate products, as above noted, which when subjected to hydrolysis results in the formation of hydrazine.

In the case of urea the reactions can be represented as follows:

Irradiation:

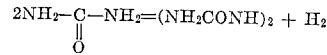

Hydrolysis:

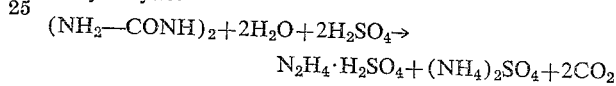

Ammoniation:

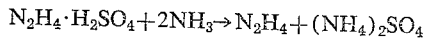

Based on the analysis results given above in the case of Example I, the reaction yield was indicated to be about 1,500 molecules of hydrazine per atom of $C^{14}$ produced or about 0.3 to 0.4 molecule of hydrazine per 100 electron volts of energy released. With a yield of 0.4 mol of hydrazine per 100 electron volts, a production of about 45,000 pounds is obtainable with a burn-up of one mol (235 grams) of $U^{235}$ since the energy that can be utilized is about $160 \times 10^6$ electron volts per gram mol of $U^{235}$.

In accordance with a preferred embodiment of this invention an enriched uranium oxide ($UO_2$) containing about 10% by weight of the $U^{235}$ isotope is mixed with urea, guanidine, melamine or mixtures thereof in the form of these compounds or their salts in the solid, molten or solution state to produce mixtures containing about 20 wt. percent $UO_2$. The mixture is fed into the nuclear reactor where the neutron flux is about $10^{14}$ neutrons per square centimeter per second. A suitable cooling medium, such as air, is circulated through the reactor to avoid overheating the reaction mixture. The rate of feed of the mixture and the rate of withdrawal of the reaction and fission products are controlled to maintain the desired level of reactor power and residence times for the reactant. The intermediate reaction product produced, biurea in the case of urea, is separated from unreacted reactant and the fission material. The unreacted reactant and fission material are returned to the nuclear reactor. When hydrazine is the desired end product, the intermediate reaction product is hydrolyzed to produce hydrazine salt which is converted to hydrazine by treatment with ammonia.

It will be noted that the present invention provides a nuclear irradiation process of producing biurea and hydrazine which is economically attractive from the standpoint of producing high yields of biurea or hydrazine based on the quantity of urea, guanidine or melamine consumed in the process.

It will be understood that the invention is not to be limited to the present disclosure except as defined by the appended claims.

What is claimed is:

1. The process of producing biurea which comprises subjecting urea to nuclear irradiation of sufficient intensity and for a time sufficient to form biurea and isolating the biurea thus produced.

2. The process of producing biurea which comprises the steps of mixing urea with uranium oxide, subjecting the resultant mixture to irradiation of sufficient intensity and a time sufficient to form biurea in a nuclear reactor, withdrawing the resultant reaction product and fission material from the reactor at a rate proportional to the feed, and separating the biurea thus produced from the fission material.

3. The process of claim 2, in which the mixture is subjected to neutron flux in the range of from about $10^{14}$ to $10^{15}$ neutrons per square centimeter per second.

4. The process of producing hydrazine which comprises subjecting a compound selected from the group consisting of urea, guanidine, melamine, their salts and mixtures thereof to nuclear irradiation of sufficient intensity and for a time sufficient to form an intermediate reaction product which upon hydrolysis forms hydrazine, separating said intermediate reaction product from the fission products, and hydrolyzing the intermediate reaction product to produce hydrazine.

5. The process of producing hydrazine which comprises the steps of mixing a nitrogen compound selected from the group consisting of urea, guanidine and melamine with uranium oxide containing $U^{235}$ isotope, subjecting the resultant mixture to irradiation of sufficient intensity and for a time sufficient to form an intermediate reaction product which upon hydrolysis forms hydrazine in a nuclear reactor, withdrawing the resultant reaction products and fission material from the reactor at a rate proportional to the feed, separating the reaction products from the fission material and unreacted nitrogen compound, hydrolyzing the reaction products in the presence of an acid to produce the acid salt of hydrazine and reacting said acid salt with ammonia to produce hydrazine.

6. The process of claim 5, in which the nitrogen compound is urea and the urea in the solid phase is mixed with powdered uranium oxide to produce the mixture subjected to irradiation in the nuclear reactor.

7. The process of claim 5, in which a solution of urea in liquid ammonia is mixed with finely divided uranium oxide to produce the mixture subjected to irradiation in the reactor.

8. The process of claim 5, in which molten urea is mixed with uranium oxide in finely divided form to produce the mixture subjected to irradiation in the reactor.

9. The process of claim 5, in which the nitrogen compound is urea, the mixture of urea and uranium oxide contains about 20 weight percent $UO_2$ containing about 10% $U^{235}$ isotope, and the mixture is subjected to a neutron flux of from about $10^{14}$ to about $10^{15}$ neutrons per square centimeter per second.

10. The process of producing hydrazine which comprises subjecting a nitrogen compound selected from the group consisting of urea, guanidine and melamine to irradiation of sufficient intensity and for a time sufficient to form an intermediate reaction product which upon hydrolysis forms hydrazine in a nuclear reactor containing fissionable uranium in glass fiber packing, withdrawing the resulting products from the reactor, separating the reaction products from the unreacted nitrogen compound, hydrolyzing the reaction products in the presence of an acid to produce the acid salt of hydrazine and reacting said acid salt with ammonia to produce hydrazine.

11. The process of claim 10 in which a solution of urea in liquid ammonia is subjected to irradiation in the reactor.

12. The process of claim 10 in which molten urea is subjected to irradiation in the reactor.

13. In the process of producing hydrazine, the steps which comprise mixing a nitrogen compound selected from the group consisting of (a) urea, (b) guanidine, (c) melamine, and (d) mixtures thereof with fissionable material, subjecting the resultant mixture to irradiation of sufficient intensity and for a time sufficient to form an intermediate reaction product which upon hydrolysis forms hydrazine in a nuclear reactor, withdrawing the irradiated mixture from the reactor, recovering the intermediate reaction product from the mixture and hydrolyzing said intermediate reaction product thus recovered to produce hydrazine.

14. The process of claim 13 in which a solution of urea in liquid ammonia is subjected to fission fragment recoil energy in said reactor.

15. The process of claim 13 in which urea admixed with ammonium chloride is subjected to irradiation in said reactor.

16. The process of claim 13 in which the nitrogen compound is guanidine hydrochloride.

17. The process of claim 13 in which the nitrogen compound is melamine.

References Cited by the Examiner

UNITED STATES PATENTS 3,065,159 11/1962 Conner et al. \_\_\_\_ 204—154 X

OTHER REFERENCES

Audrieth et al., "The Chemistry of Hydrazine," John Wiley and Sons, Inc., New York, 1951, pp. 36, 37 and 52.

Noller: Chemistry of Organic Compounds, 3rd edition, Saunders, Philadelphia, 1965, p. 335.

OSCAR R. VERTIZ, *Primary Examiner.*

MAURICE A. BRINDISI, *Examiner.*

E. C. THOMAS, J. J. BROWN, H. S. MILLER,
*Assistant Examiners.*